Patented Nov. 5, 1929

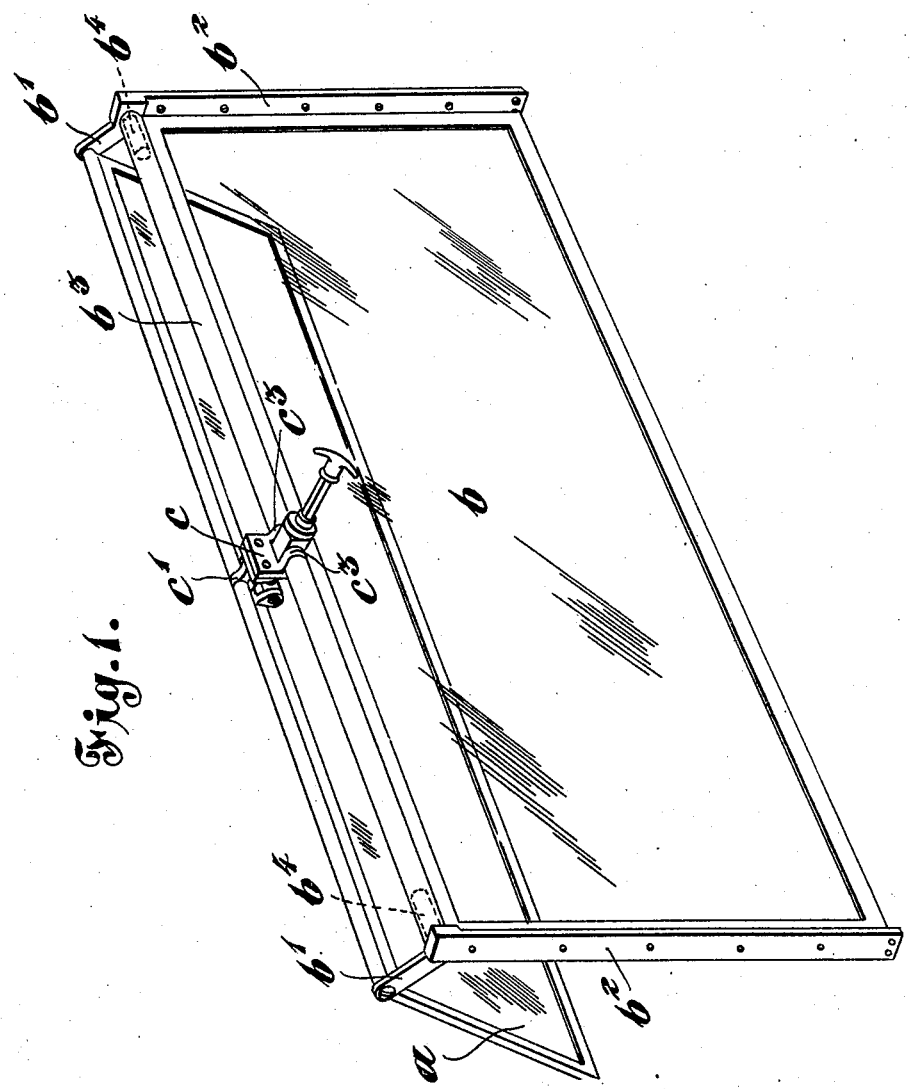

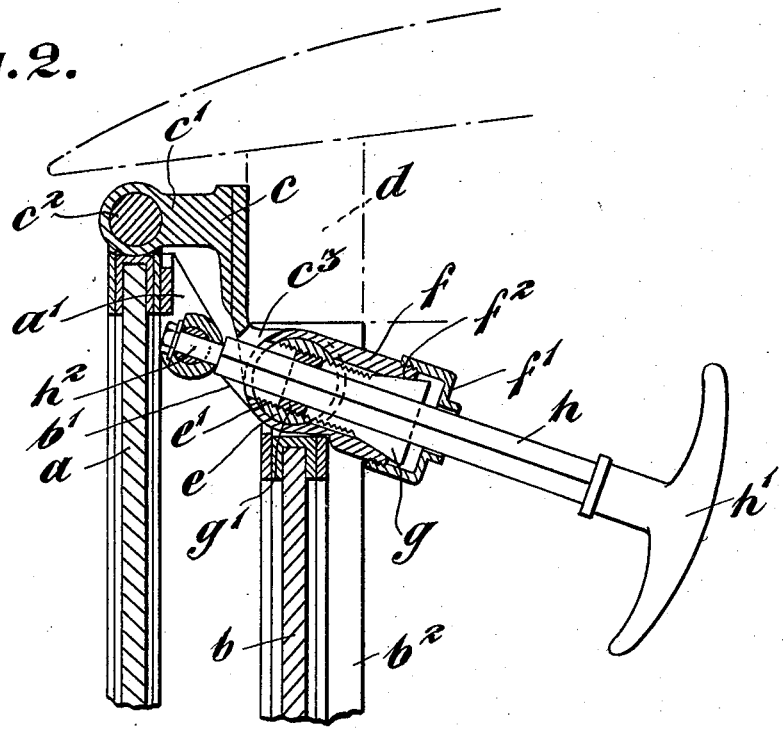
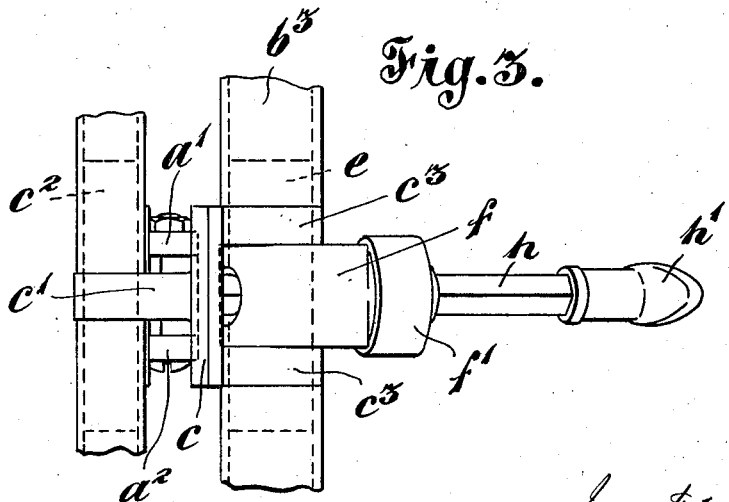

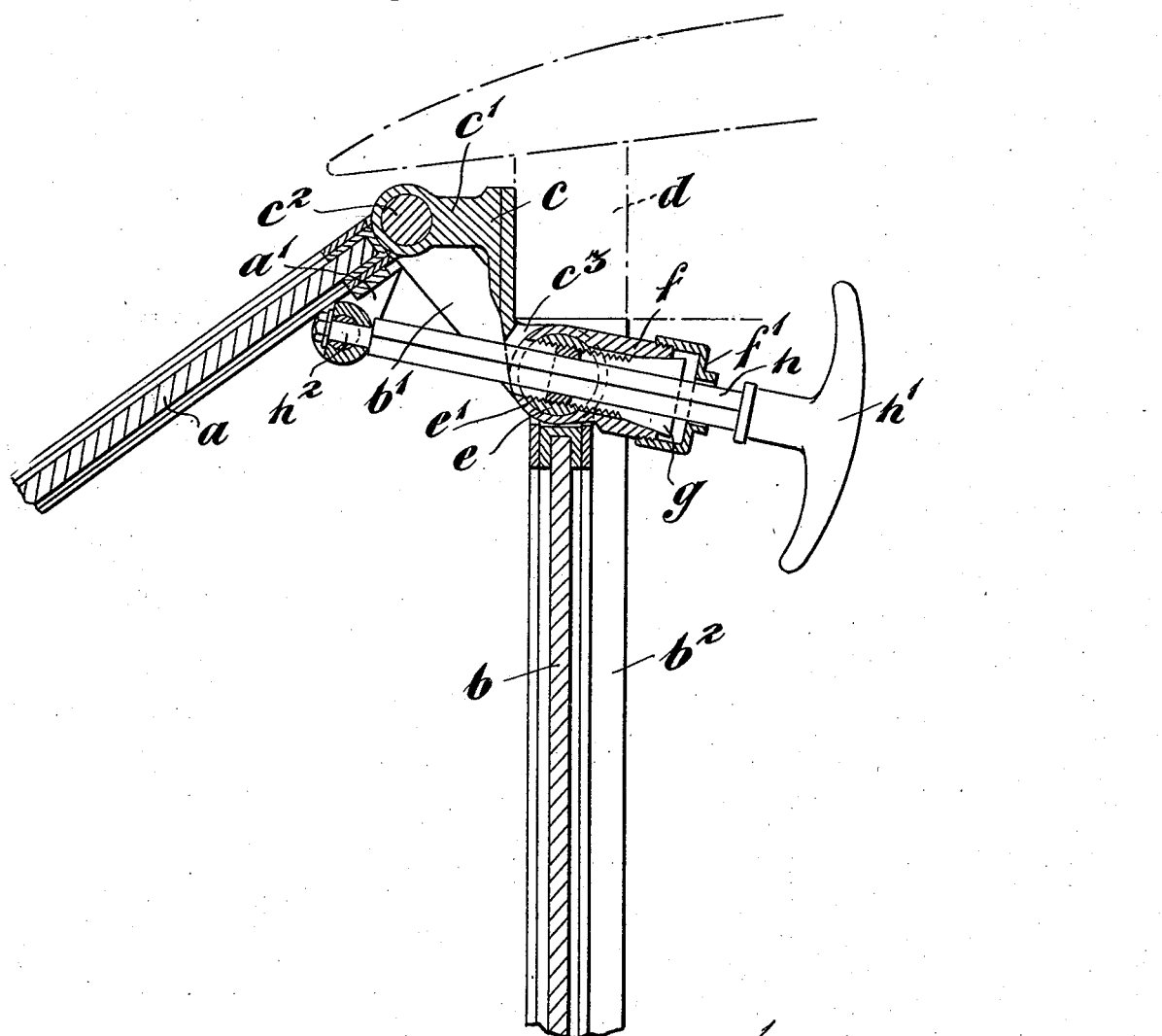

1,734,096

UNITED STATES PATENT OFFICE

GEORGE HAROLD PEARCE, OF WORCESTER, ENGLAND, ASSIGNOR, BY MESNE ASSIGNMENTS, TO HIMSELF AND ARTHUR EDWARD ERNEST JONES, OF WORCESTER, ENGLAND

GLARE VISOR OR SUN SHIELD

Application filed October 12, 1928, Serial No. 311,989, and in Great Britain July 10, 1928.

My invention has relation to a glare visor or sun shield for use upon or in connection with the windscreens of motor and like vehicles, and which is for the purpose of preventing dazzle from the rays of the sun or oncoming lights of approaching vehicles, the present invention having for its object to provide for the particularly speedy and efficient setting or adjustment of the device from the interior of the vehicle.

According to the present invention a glare visor is tiltably mounted in front of a windscreen and adapted to be operated through the medium of a handle member disposed at the rear of the windscreen, the said handle member providing for the tilting operation of the visor and in addition the locking or fixing thereof.

In this invention therefore an externally disposed glare visor is tiltably manipulated with ease from the interior of the vehicle.

In order that this invention may be clearly understood and readily carried into practice, reference may be had to the appended explanatory sheet of drawings, upon which:—

Figure 1 is a perspective view of a windscreen complete with glare visor and operating mechanism therefor, constructed according to the present invention.

Figure 2 is a transverse sectional elevation drawn to a larger scale illustrating particularly the handle operating and fastening mechanism.

Figure 3 is a plan view of the mechanism shown in Figure 2.

Figure 4 is a transverse sectional elevation corresponding to that shown in Figure 2 only in an alternative or forwardly tilted position of adjustment.

In this invention the glare visor $a$ is tiltably suspended from forwardly protruding lugs $b^1$ on the main supporting frame $b^2$ of the windscreen $b$. $b^3$ is the tubular top part of the screen $b$ which may operate on fulcrum pins $b^4$ carried by the members $b^2$. $c$ is an attachment plate secured to the upper part of the vehicle $d$ for location purposes, the said plate $c$ having an arm $c^1$ which constitutes a central pivot support through the medium of the pin $c^2$ for the glare visor $a$. This plate $c$ has bifurcations $c^3$ which are centrally bored to receive a solid pin $e$ (see particularly Figure 3) adapted to rotate in the upper tubular member $b^3$ of the windscreen. $f$ is a hollow housing secured to the solid pin $e$ and closed at one extremity by a suitable cap $f^1$. The solid pin $e$ is bored and tapped transversely as at $e^1$ and is adapted to receive the forward extremity $g^1$ of a clutch member $g$ operating within the housing $f$. This clutch member $g$ is split throughout the major part of its length and at its foremost extremity $g^1$ has a screw connection with the aperture $e^1$, whilst at its rearmost part it is of conical formation adapted to co-operate with a conical face $f^2$ on the housing $f$. Internally the clutch member has an axial opening of square section. Within this square section opening a square section shaft $h$ is adapted to slidably operate, the said shaft $h$ having a handle $h^1$ and being connected at its foremost extremity $h^2$ by a plain swivel joint to lugs $a^1$ offset from the pivot $c^2$ and provided upon the glare visor $a$.

It will be appreciated that the plate $c$ and its lugs $c^3$ are stationary, whereas the housing $f$ fixed to the pin $e^3$ is capable of a rocking motion inasmuch as the solid pin $e$ can rotate within the upper tubular member $b^3$.

In operation therefore in order to adjust the visor, the handle $h^1$ is rotated carrying with it the clutch member $g$ until such time as the conical faces are effectively released. The shaft $h$ through the medium of the handle $h^1$ may be slid axially to tilt the glare visor $a$ to the desired angle (see particularly Figures 2 and 4). When the desired angle has been obtained a final rotary movement of the handle $h^1$ causes the conical faces to be effectively engaged to clutch the visor in its position of adjustment.

What I claim as my invention and desire to secure by Letters Patent is:

A glare visor tiltably suspended in front of a windscreen, a shaft connected thereto, an attachment plate adapted for attachment to a head fitting of the vehicle, a lug thereon lending support to the visor, perforated bifurcations on said attachment plate, a housing pivotally mounted in an upper tubular part of the windscreen between the aforesaid bifurcations, a solid pin passing through the perforations in the bifurcations constituting a pivot for the housing, a split cone member through which the shaft is adapted to slide, said cone member having a non-rotary engagement with the shaft, and a screw-thread engagement with the interior of the housing, as well as a conical engagement therewith.

In witness whereof I have hereunto set my hand.

GEORGE HAROLD PEARCE.